(12) United States Patent  (10) Patent No.: US 8,596,173 B2
Fung  (45) Date of Patent: Dec. 3, 2013

(54) PEELING TOOL

(75) Inventor: Kam Fai Fung, Tuen Mun (HK)

(73) Assignee: Conair Corporation, Stamford, CT (US)

( * ) Notice: Subject to any disclaimer, the term of this patent is extended or adjusted under 35 U.S.C. 154(b) by 308 days.

(21) Appl. No.: 13/189,710

(22) Filed: Jul. 25, 2011

(65) Prior Publication Data

US 2013/0025133 A1   Jan. 31, 2013

(51) Int. Cl.
*B26D 1/00* (2006.01)
*A01D 1/12* (2006.01)
*B26B 9/02* (2006.01)

(52) U.S. Cl.
USPC .................................. 83/13; 30/151; 30/279.2

(58) Field of Classification Search
USPC ................ 30/2, 26, 27, 121.5, 151, 162, 502, 30/279.6; 83/13
See application file for complete search history.

(56) References Cited

U.S. PATENT DOCUMENTS

| | | | | |
|---|---|---|---|---|
| 2,105,239 A | * | 1/1938 | Bachtold | 30/151 |
| 2,252,094 A | | 8/1941 | Palmer | |
| 2,493,588 A | * | 1/1950 | Martin | 30/121.5 |
| 3,009,245 A | | 11/1961 | Senkewitz | |
| 3,220,110 A | | 11/1965 | Popeil | |
| 4,592,140 A | | 6/1986 | Chasen | |
| 5,001,835 A | * | 3/1991 | Boerner | 30/278 |
| 5,071,426 A | * | 12/1991 | Dolgin et al. | 606/167 |
| 5,139,507 A | * | 8/1992 | Dolgin et al. | 606/167 |
| 5,201,748 A | * | 4/1993 | Newman et al. | 606/167 |
| 5,254,128 A | * | 10/1993 | Mesa | 606/167 |
| 6,336,271 B1 | | 1/2002 | Rider et al. | |
| 6,619,194 B1 | * | 9/2003 | Kuan | 99/588 |
| 6,626,925 B2 | * | 9/2003 | Newman et al. | 606/167 |
| 6,671,964 B2 | * | 1/2004 | Ruiz | 30/123.6 |
| D486,703 S | * | 2/2004 | Settele | D7/695 |
| D488,683 S | * | 4/2004 | Overthun et al. | D7/695 |
| D502,063 S | * | 2/2005 | Lee | D7/695 |
| 6,874,236 B2 | * | 4/2005 | Levien et al. | 30/279.6 |
| D532,261 S | * | 11/2006 | Mellen et al. | D7/673 |
| 7,140,111 B2 | * | 11/2006 | Di Bitonto et al. | 30/279.6 |
| D535,160 S | * | 1/2007 | Ishii | D7/673 |
| 7,631,429 B2 | * | 12/2009 | Chapman et al. | 30/279.6 |
| D611,311 S | * | 3/2010 | Smith et al. | D7/673 |
| 7,712,402 B2 | * | 5/2010 | Ishii | 83/13 |
| D625,567 S | * | 10/2010 | Wong | D7/673 |
| 7,866,243 B2 | * | 1/2011 | DiPietro | 83/856 |
| 8,114,103 B2 | * | 2/2012 | Rasco | 606/167 |
| D674,254 S | * | 1/2013 | Spiegel | D7/695 |
| D679,964 S | * | 4/2013 | Deconzo | D7/695 |
| 8,430,010 B2 | * | 4/2013 | Holmes et al. | 83/856 |
| D683,200 S | * | 5/2013 | Joseph | D7/695 |
| 2010/0162576 A1 | * | 7/2010 | Scimone | 30/279.6 |
| 2011/0030221 A1 | * | 2/2011 | Frank | 30/113.3 |
| 2011/0289783 A1 | * | 12/2011 | Polyakova et al. | 30/153 |
| 2012/0073142 A1 | * | 3/2012 | Zeng | 30/162 |
| 2013/0091712 A1 | * | 4/2013 | Schekalla | 30/162 |

* cited by examiner

*Primary Examiner* — Sean Michalski
(74) *Attorney, Agent, or Firm* — McCormick Paulding Huber LLP

(57) ABSTRACT

A peeling tool includes a main shaft, a handle affixed to a first portion of the main shaft, a nose rotatbly coupled to a second portion of the main shaft, a blade assembly positioned intermediate the handle and the nose about the main shaft, the blade assembly including a first arcuate blade and a second arcuate blade defining a space for the passage of a slice of a food product, and a peel thickness adjustment mechanism, the peel thickness adjustment mechanism being actuatable to adjust a dimension of the space.

16 Claims, 12 Drawing Sheets

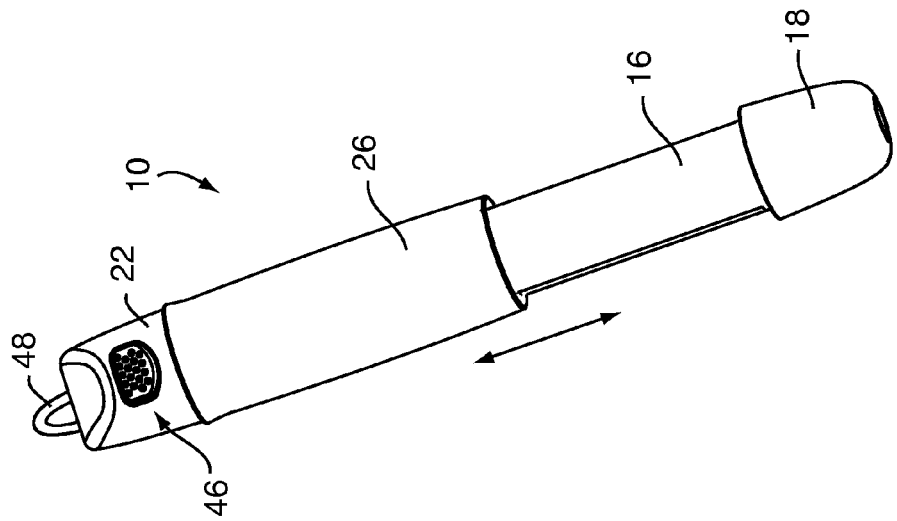
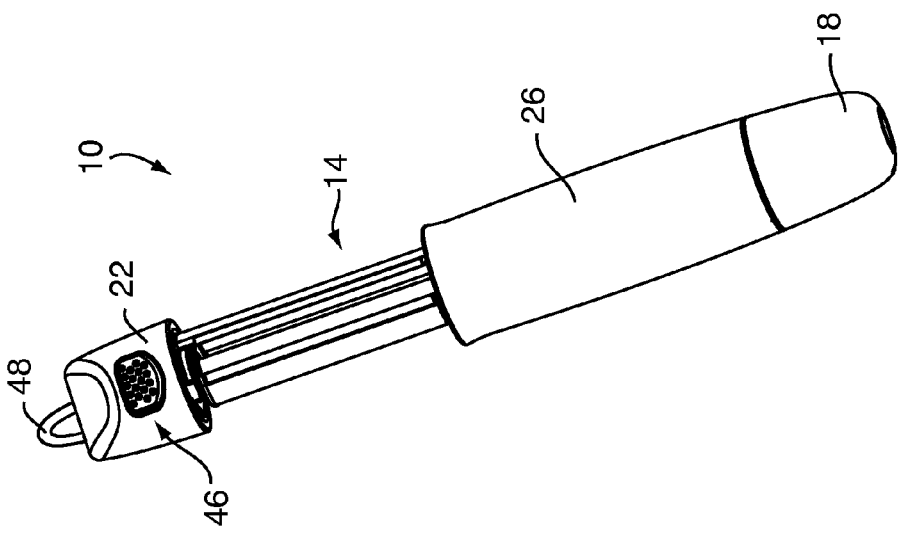
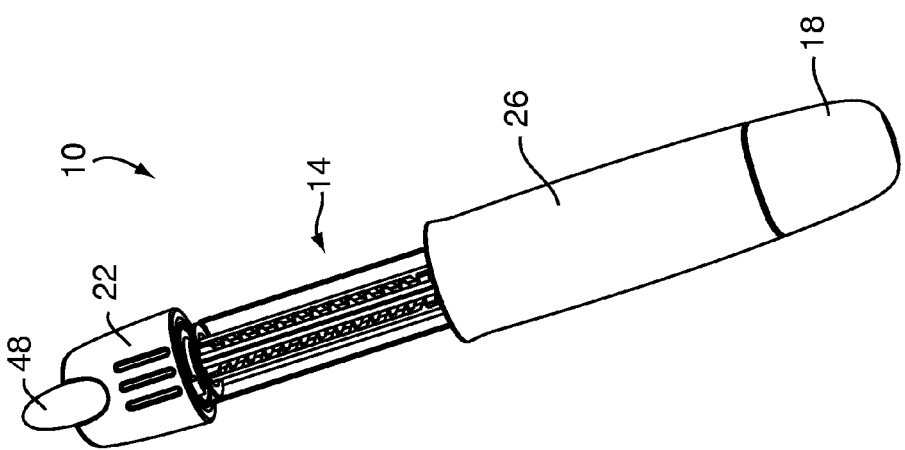

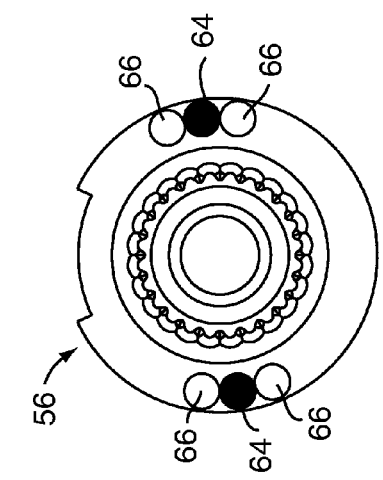
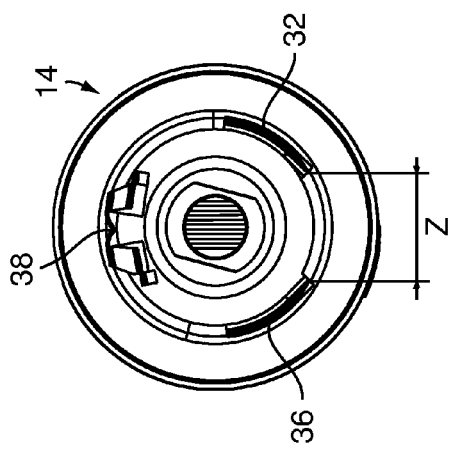
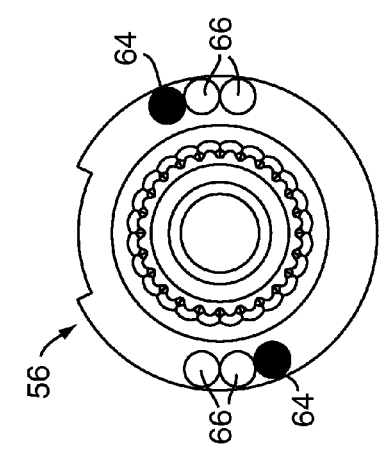
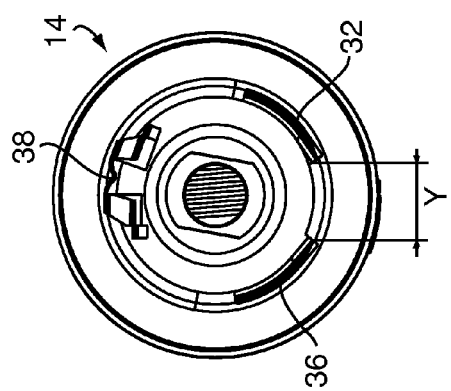
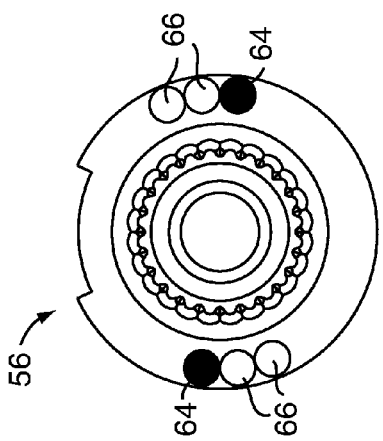
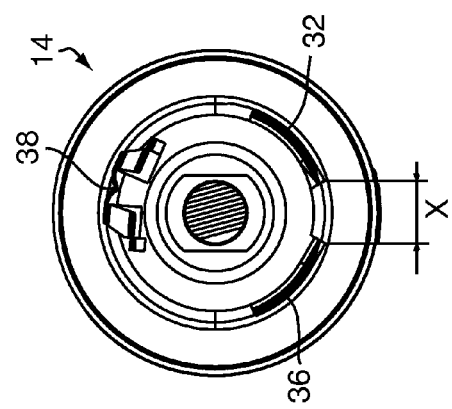

PEELING TOOL

FIELD OF THE INVENTION

The present invention relates generally to food preparation devices and, more particularly, to a peeling tool for peeling the skins of fruits and vegetables and for shaving fruits and vegetables.

BACKGROUND OF THE INVENTION

Various designs exist for handheld food peeling devices that include a handle and a blade whereby a user manually pushes the blade across a food product to slice the food product. While existing handheld food peeling devices are generally suitable for what is regarded as ordinary performance, there is room for improvement in terms of adaptability, such as peel thickness and peel type customization, flexibility, and safety.

SUMMARY OF THE INVENTION

It is an object of the present invention to provide a peeling tool for peeling food products having a mechanism for adjusting peel thickness, a selectively actuatable safety cover and a multi-blade peeling cartridge.

These and other objects are achieved by the present invention.

A peeling tool includes a main shaft, a handle affixed to a first portion of the main shaft, a nose rotatably coupled to a second portion of the main shaft, a blade assembly positioned intermediate the handle and the nose about the main shaft, the blade assembly including a first arcuate blade and a second arcuate blade defining a space therebetween for the passage of a slice of a food product, and a peel thickness adjustment mechanism, the peel thickness adjustment mechanism being actuatable to adjust a dimension of the space.

BRIEF DESCRIPTION OF THE DRAWINGS

The present invention will be better understood from reading the following description of non-limiting embodiments, with reference to the attached drawings, wherein below:

FIG. 1 is a perspective view showing the front a peeling tool with a flat peeling blade exposed according to a first preferred embodiment of the present invention.

FIG. 2 is a perspective view showing the back of the peeling tool of FIG. 1 with a julienne peeling blade exposed.

FIG. 3 is a perspective view showing the front of the peeling tool of FIG. 1 with a sleeve in a safety position.

FIGS. 23A-25B illustrate locking positions and blade positions corresponding to minimum, medium and maximum peel thickness.

DETAILED DESCRIPTION OF THE PREFERRED EMBODIMENT

Figure 4:
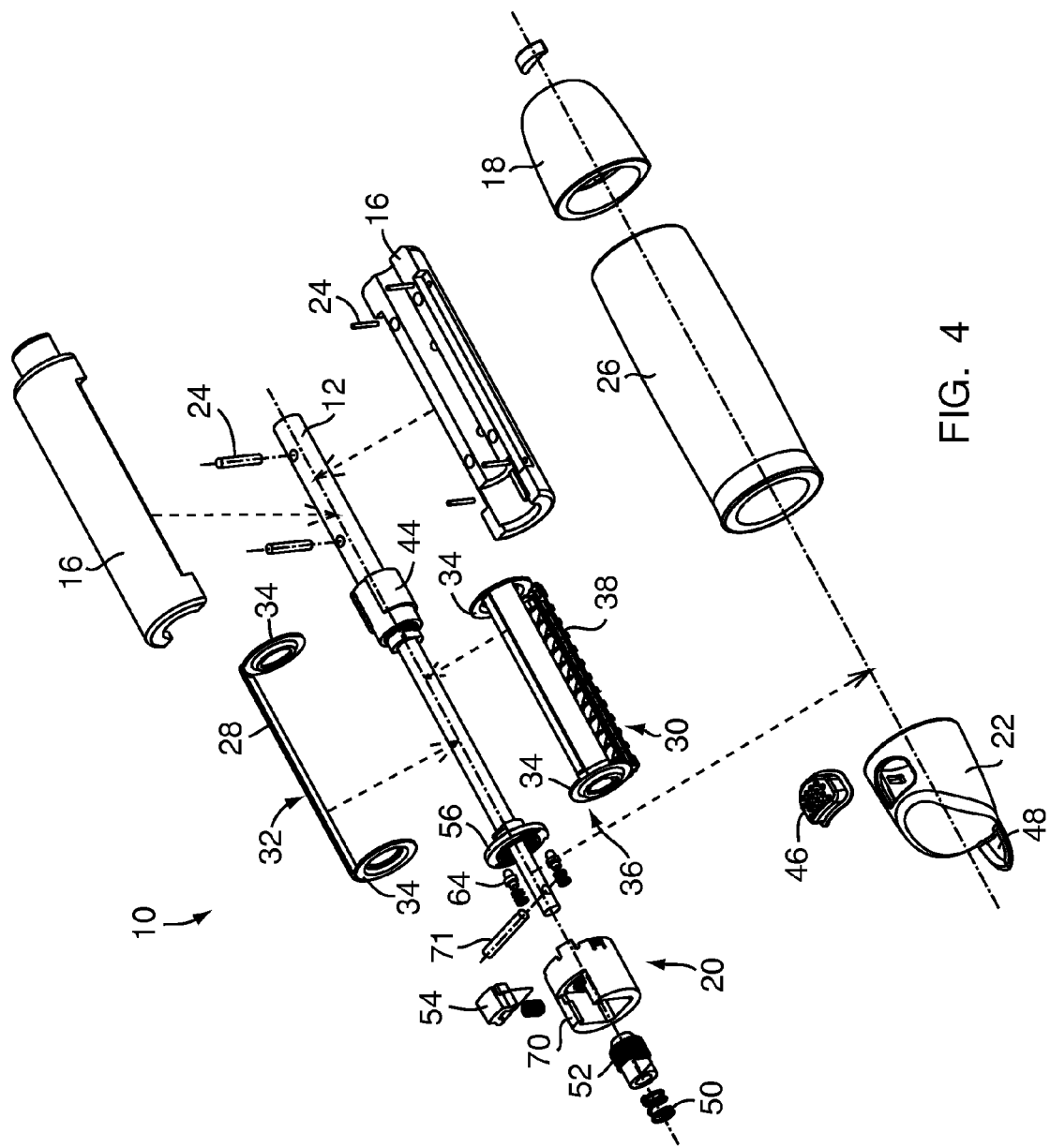
FIG. 4 is an exploded view of the peeling tool of FIG. 1 illustrating the physical components thereof.

Referring generally to FIGS. 1-4, a peeling tool 10 according to a first preferred embodiment of the present invention comprises a main shaft 12, a blade assembly 14, a fixed holder or main handle 16, an end cap 18 and a peel thickness adjustment mechanism 20 contained within a nose 22. As shown in FIGS. 1-3 the main shaft 12, holder 16 and blade assembly 14 define an elongated body of the peeling tool 10. The main shaft 12 is preferably made of metal or other strong material suitable to withstand bending stress during use.

As best shown in FIG. 4, the fixed holder 16 is a two part skin that is fixedly secured to, and encompasses, one end of the main shaft 12. In the preferred embodiment, the fixed holder 16 is secured to the main shaft 12 via pins 24. The nose 22 containing the peel thickness adjustment mechanism 20 is rotatably coupled to the other end of the main shaft 12, and the blade assembly 14 is mounted about the main shaft 12 intermediate the fixed holder 16 and the nose 22. As best shown in FIGS. 1-3, a sleeve 26 is slidably mounted about the blade assembly 14 and fixed holder 16 intermediate the nose 22 and end cap 18. As shown therein, the end cap 18, nose 22 and sleeve 26 have an enlarged and substantially equal diameter as compared to the fixed holder 16 and cylindrical blade assembly 14.

Importantly, as noted above, the sleeve 26 is slidable from a first position, as shown in FIGS. 1 and 2, in which the sleeve 26 encompasses the fixed holder 16 and abuts the end cap 18, to a second position, as shown in FIG. 3, in which the sleeve 26 encompasses the blade assembly 14 and abuts the nose 22. As will be readily appreciated, in the first position, the sleeve 26 functions as an ergonomic handle for gripping the peeling tool 10 during use. In the second position, the sleeve 26 encompasses the blade assembly 14 for safety and for protecting the blade assembly 14 when the tool 10 is not in use.

Figure 5:
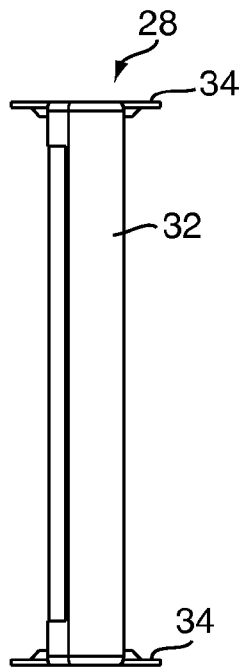
FIG. 5-8 are various views of the flat blade portion of the blade assembly of the peeling tool of FIG. 1.
Figure 6:
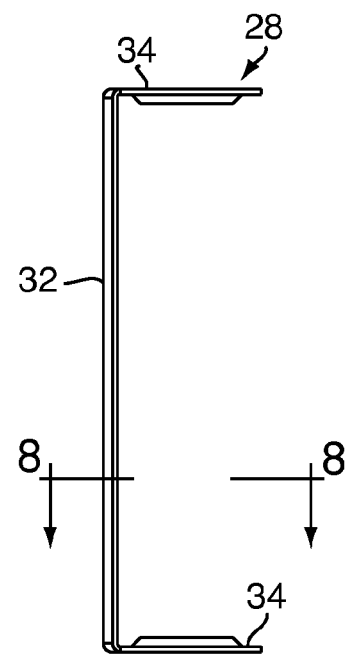
Figure 7:
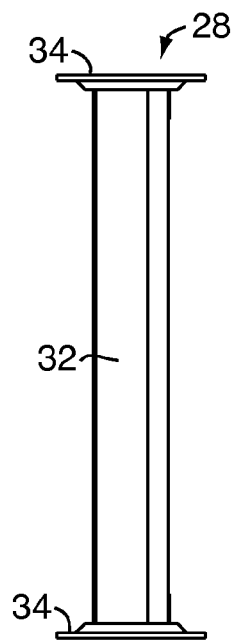
Figure 8:
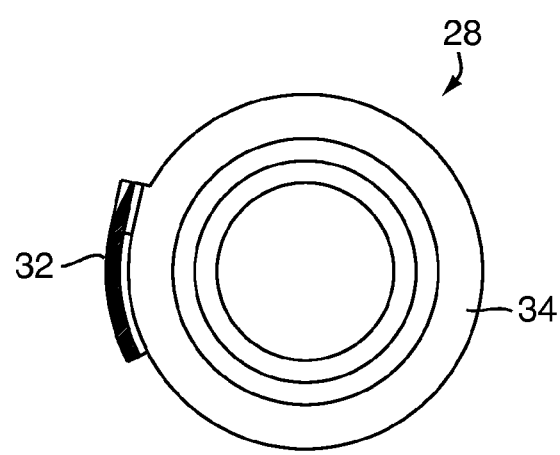
Figure 9:
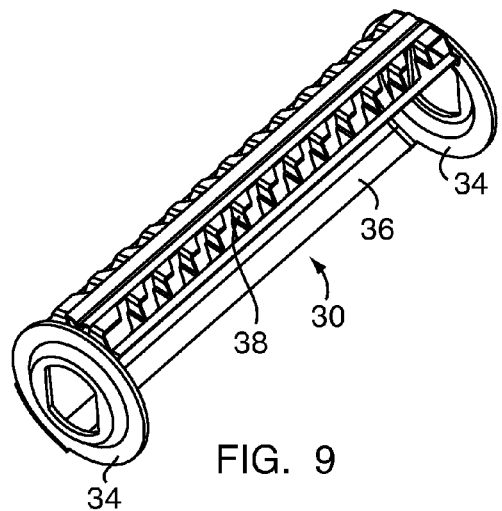
FIGS. 9-13 are various views of the right, julienne blade portion of the blade assembly of the peeling tool of FIG. 1.
Figure 10:
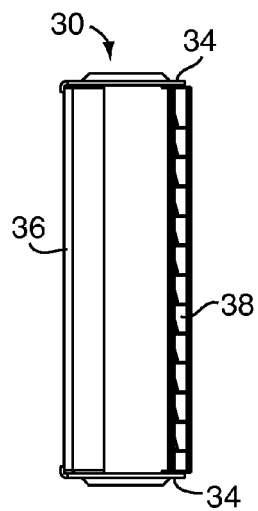
Figure 11:
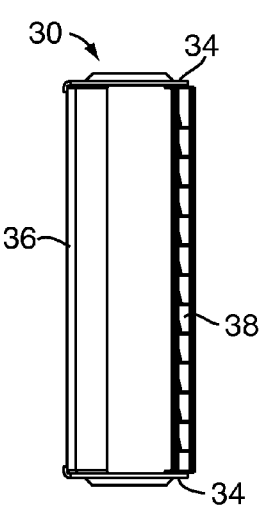
Figure 12:
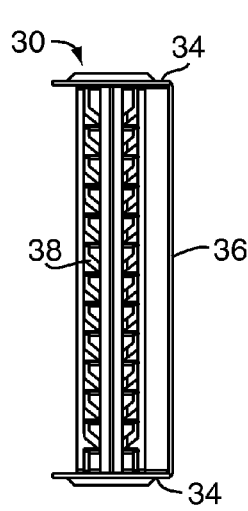
Figure 13:
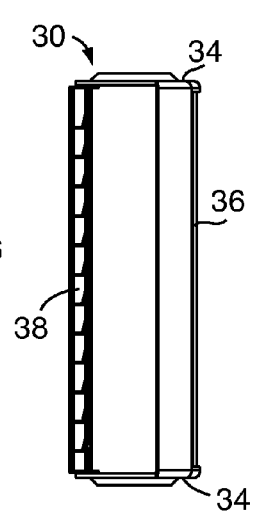

As further shown in FIG. 5, the blade assembly 14 includes two separate blade portions, a flat blade portion 28 and a julienne blade portion 30 for making flat peel slices and julienne peel strips, respectively. FIGS. 5-8 show various views of the flat blade portion 28. The flat blade portion 28 includes a right flat blade 32 integrally formed with two annular guides 34 at respective ends of the blade 32. Alternatively, the right flat blade 32 may be spot welded to the annular guides 34.

FIGS. 9-13 show various views of the julienne blade portion 30. The julienne blade portion 30 includes a left flat blade 36, to compliment the right flat blade 32 of the flat blade portion 28, and a julienne blade 38. The left flat blade 36 and julienne blade 38 are integrally formed with two annular guides 34 at respective ends of the blades. Alternatively, the left flat blade 36 and julienne blade 38 may be spot welded at 39 to the annular guides 34.

Figure 16:
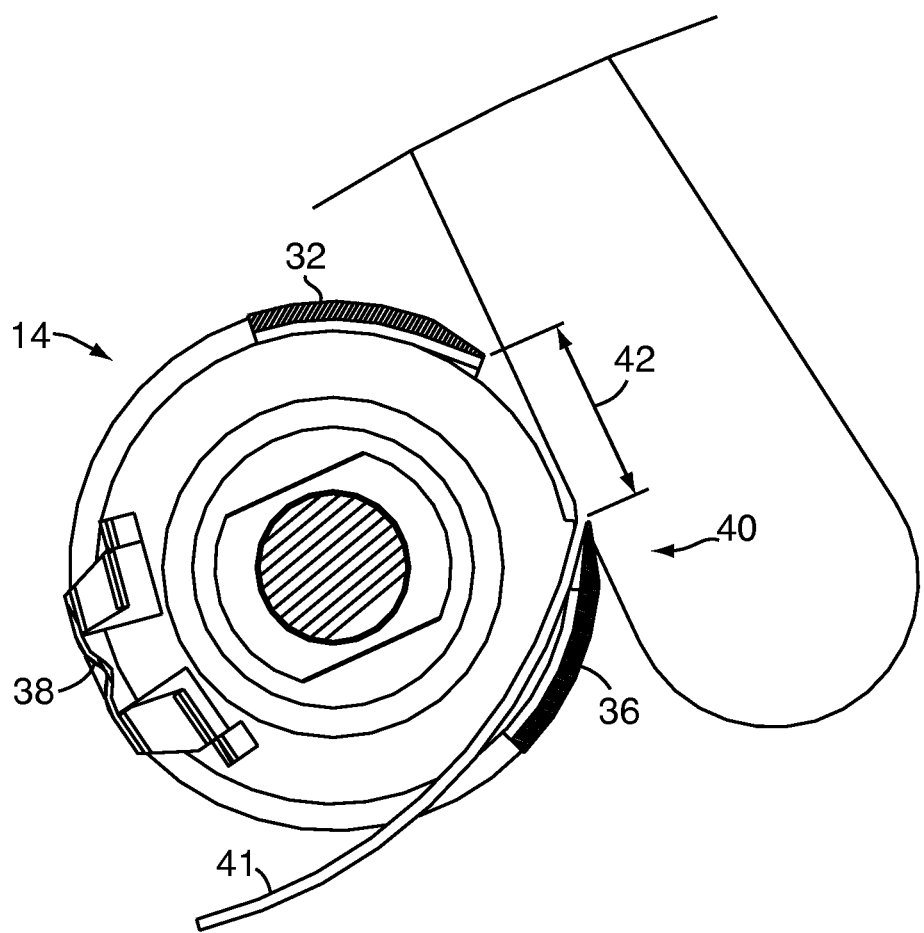
FIG. 16 is a top plan view of the blade assembly of the peeling tool illustrating the cutting of a food product with the flat blade portion of the blade assembly.

In an assembled state, the flat blade portion 28 and julienne blade portion 30 are brought into registration with one another to form the generally cylindrical blade assembly 14. As will be readily appreciated, the julienne blade 38 and flat blades 32,36 are oriented opposite one another on the blade assembly 14 such that a user simply rotates the peeling tool 10 within his or her hand to present the desired blade system to the food product to be peeled, as discussed in detail below and as shown in FIG. 16. As discussed above, the blade assembly 14 is received on the main shaft 12 by inserting the shaft 12 through the annular guides 34. Importantly, however, the flat blade portion 28 and julienne blade portion 30 are not affixed to one another, such that the flat blade portion 28 is capable of rotating slightly about the main shaft 12 independently of the julienne blade portion 30 to adjust for peel thickness, as discussed in detail below.

Figure 15:
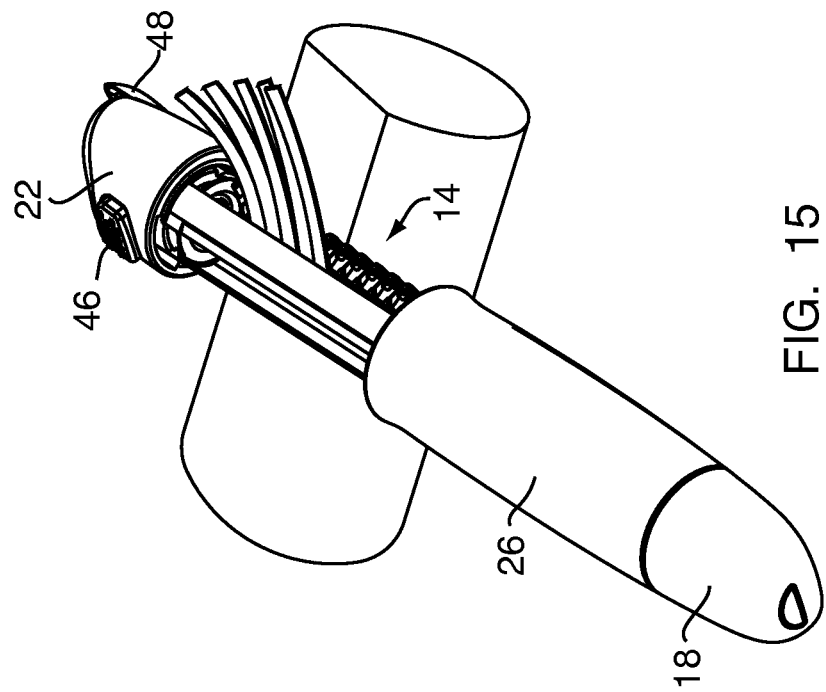
FIGS. 14-15 illustrate the cutting of a food product with the julienne blade portion of the blade assembly of the peeling tool.
Figure 14:
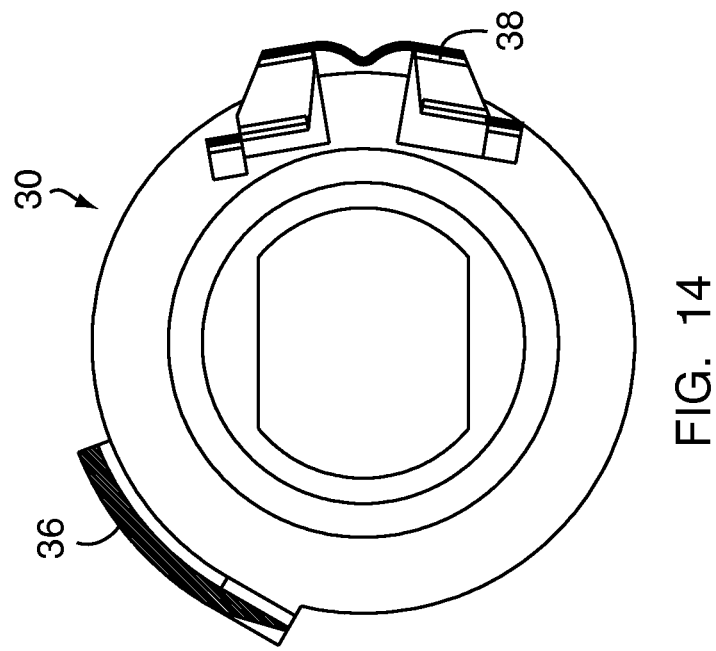

FIGS. 14 and 15 illustrate the cutting of a food product with the julienne blade 38. Importantly, the julienne blade 38 can be used to cut from either side of the blade for right-handed and left-handed users. Referring now to FIG. 16, a top plan view of the blade assembly 14 is shown. As discussed above, the blade assembly 14 includes three separate blades, a left flat blade 36, a right flat blade 32 and a julienne blade 38. FIG. 16 illustrates the cutting of a food product 40 with one of the flat blades 32,36. In operation, the peel or a slice 41 of a food product 40 passes in between the space 42 between the left flat blade 36 and right flat blade 32 as the food product is peeled/sliced. Importantly, this space 42 may adjusted for peeling different thicknesses of skin, as discussed below.

Figure 17:
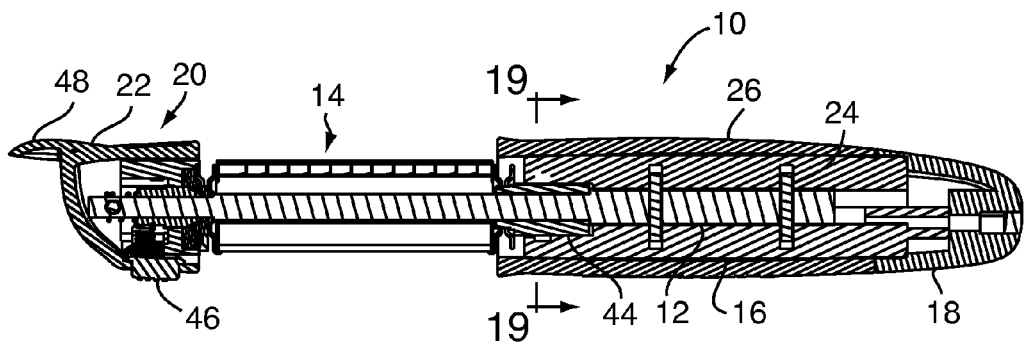
FIG. 17 is a longitudinal cross-sectional view of the peeling tool of FIG. 1.

Turning now to FIG. 17, a longitudinal cross-section view of the peeling tool 10 is shown. As shown therein, a stopper 44 is fixedly secured to the metal shaft 12 and holds the blade assembly 14 in proper position for peeling. In particular, the stopper 44 prevents the blade assembly 14 from sliding too far down the shaft 12 towards the end cap 18.

Figure 18:
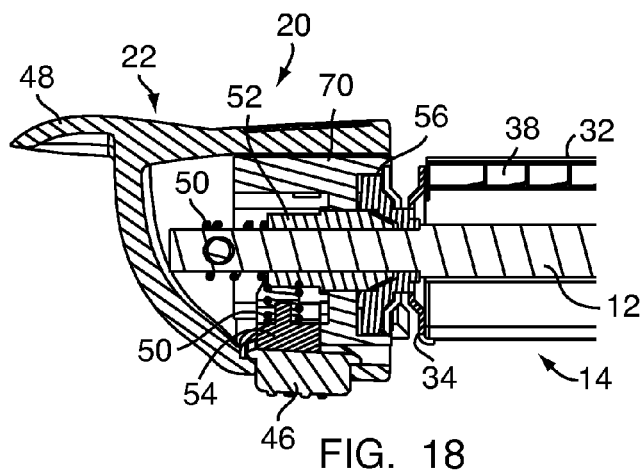
FIG. 18 is an enlarged, detail cross sectional view of a nose of the peeling tool of FIG. 1.

Referring to FIG. 18, an enlarged, cross-section view of the nose 22 is shown. As shown therein, the nose 22 defines a housing and includes a release button 46 for activating the peel thickness adjustment mechanism 20, as discussed in detail below, and a sharpened tip 48 for removing potato eyes or blemishes from food products. The nose 22 is rotatably coupled to the main shaft 12 and houses the peel thickness adjustment mechanism 20. As shown in FIG. 18, the nose 22 contains a spring 50 operatively connected to the nose 22 for rotatably biasing the nose 22 relative to the main shaft 12, a first lock 52, a second lock 54, a localizer 56 and the release button 46.

Figure 19:
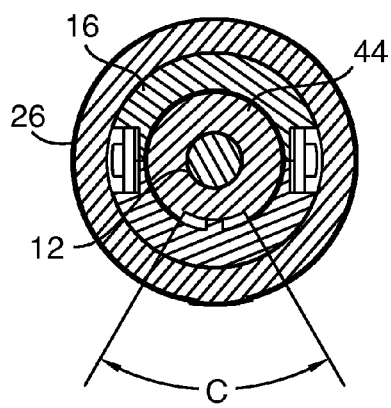
FIG. 19 is a cross-sectional view of the peeling tool of FIG. 1, taken along line A-A of FIG. 5.

As shown in FIG. 19, the blade assembly 14 is mounted on the main shaft 12 and is configured to swing about an angle C. Importantly, this swinging configuration of the blade assembly 14 ensures that the peeler 10, and the blade assembly 14 in particular, is always in contact with the skin of various food products that may be oddly or irregularly shaped.

Figure 20:
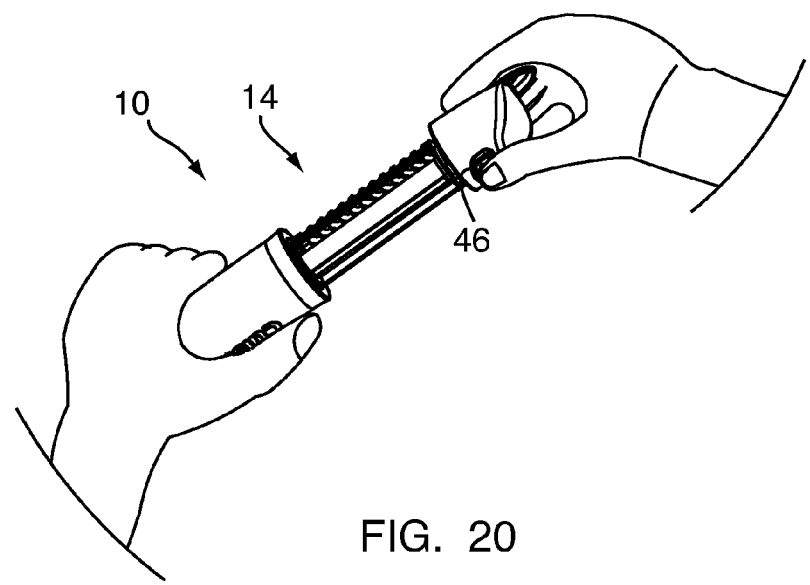
FIG. 20 is a perspective view of the peeling tool of FIG. 1 illustrating how a user adjusts the tool for peel thickness.

FIG. 20 illustrates how a user may adjust the peeler 10 for peeling different thicknesses of skin. As shown therein, a user pushes down on the release button 46 on the nose 22 to free the nose 22. The nose 22 may then be rotated clockwise or counterclockwise to adjust the space 42, i.e., the width between the left flat blade 36 and right flat blade 32 (this space 42 can best be seen in FIG. 16).

Figure 21:
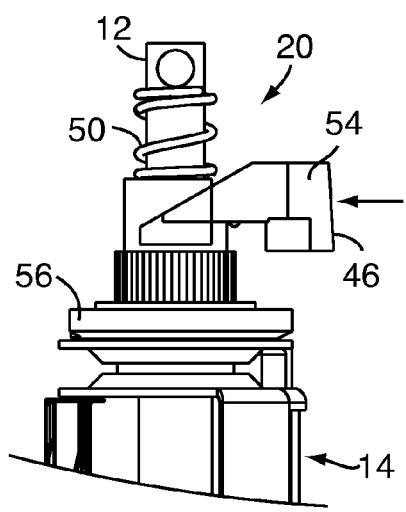
FIG. 21 is a side elevational view of a first and second locking mechanism of the peeling tool of FIG. 1.
Figure 22:
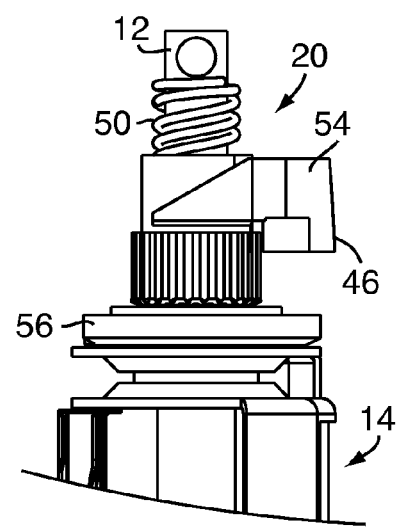
FIG. 22 is a reverse side elevational view of the first and second locking mechanism of the peeling tool.
Figure 26:
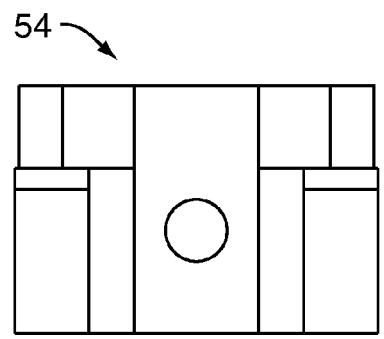
FIGS. 26-28 are various views illustrating the structure of the second locking mechanism.
Figure 27:
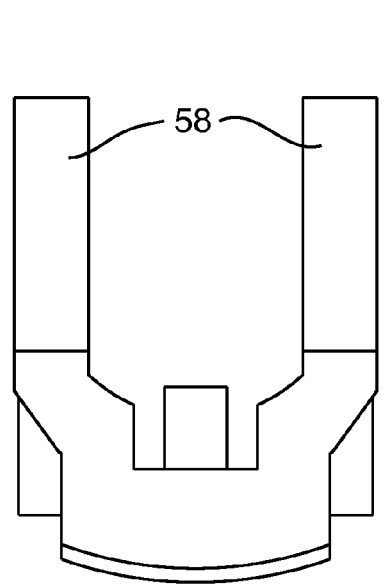
Figure 28:
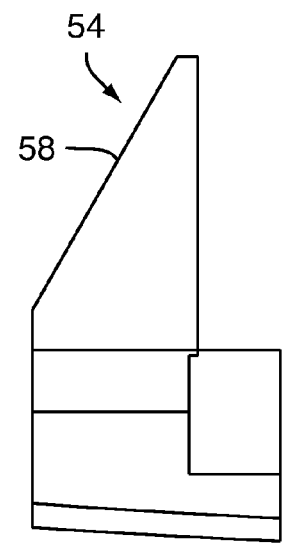
Figure 32:
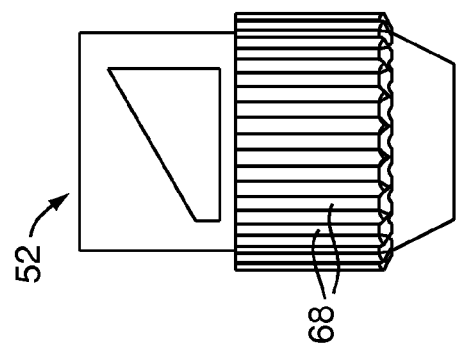
FIGS. 29-33 are various views illustrating the structure of the first locking mechanism.
Figure 31:
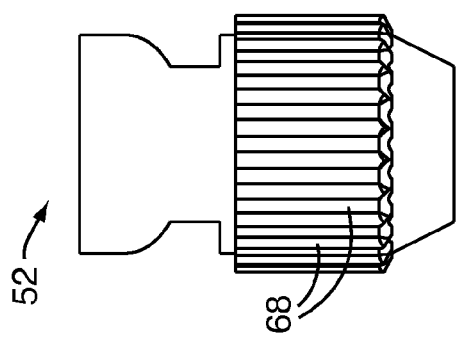
Figure 33:
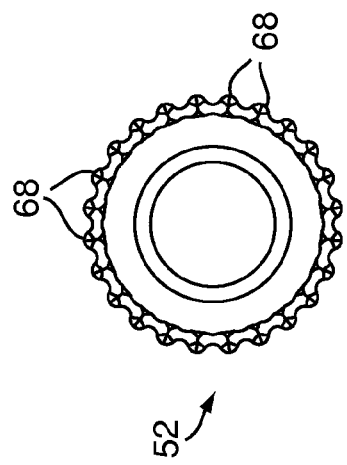
Figure 30:
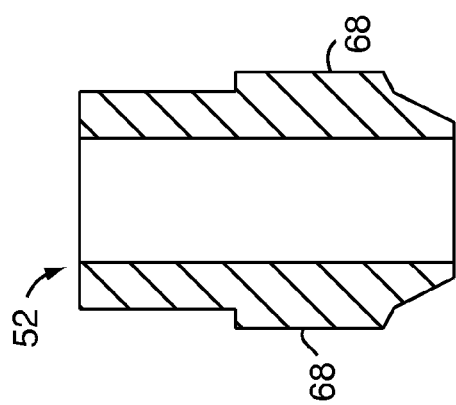
Figure 29:
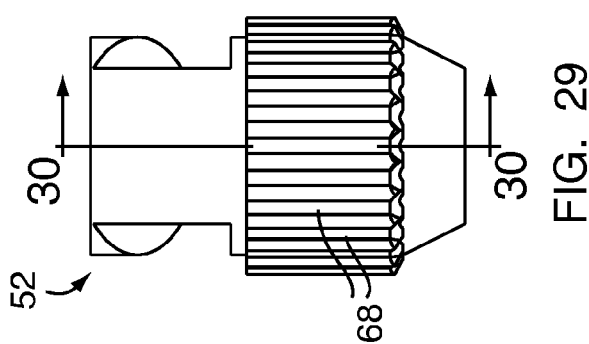

In particular, as shown in FIGS. 21 and 22, when the button 46 is depressed and the nose 22 is rotated, a ramp 58 of the second lock 54 engages a correspondingly-shaped slot 60 in the first lock 52 to rotate the first lock 52. This rotation of the first lock 52 causes the first lock 52 to move upwards, away from the blade assembly 14, until teeth 62 on the first lock 52 disengage from the end of the flat blade portion 28 such that the flat blade portion 28 becomes loose and its position can be adjusted. This upwards movement also releases spring biased lock balls 64 from their seated position within the localizer 56, which permits the localizer 56 to be rotated which, in turn, effects rotation of the flat blade portion 28 and right flat blade 32, as discussed below. As will be readily appreciated, the position of the right flat blade 32 can be adjusted along an arcuate path as the flat blade portion 28 is rotated about the main shaft 12. This upwards movement is shown in FIGS. 21 and 22.

As noted above, the localizer 56 includes a plurality of recesses or detents 66 oriented about a circumference of the localizer 56. In the preferred embodiment, the localizer 56 includes three such recesses or detents 66 corresponding to minimum, medium and maximum peel thickness. Upon rotation of the nose 22, and thus rotation of the flat blade portion 28, the button 46 may be released at a desired point to cause spring-urged lock balls 64 to be urged into one of the plurality of recesses 66 in the localizer 56. This rotation adjusts the space 42 between the right flat blade 32 of the flat blade portion 28 and the left flat blade 36 of the julienne blade portion 30. In particular, FIG. 23A shows the position of the lock ball 64 in the first recess, which corresponds to the minimum space, x, between the blades 32,36, i.e., minimum peel thickness, as shown in FIG. 23B. FIG. 24A shows the position of the lock ball 64 in the third recess, which corresponds to maximum peel thickness, z, as shown in FIG. 24B. Finally, FIG. 25A shows the position of the lock ball 54 in the second recess, which corresponds to medium peel thickness, y, as shown in FIG. 25B.

Referring back to FIGS. 26-38, the structure of the second lock 54 is shown in detail. As shown therein, the second lock 54 has a ramp 58 that engages the corresponding slot 60 in the first lock 52 to unlock the lock system. Moreover, referring to FIGS. 29-33, the structure of the first lock 52 is shown in detail. As shown therein, the first lock 52 is generally cylindrical in shape and has a plurality of teeth 68 for matching the teeth of a holder 70, which is secured to the main shaft 12 by a lock pin 71, and the localizer 56.

Figure 35:
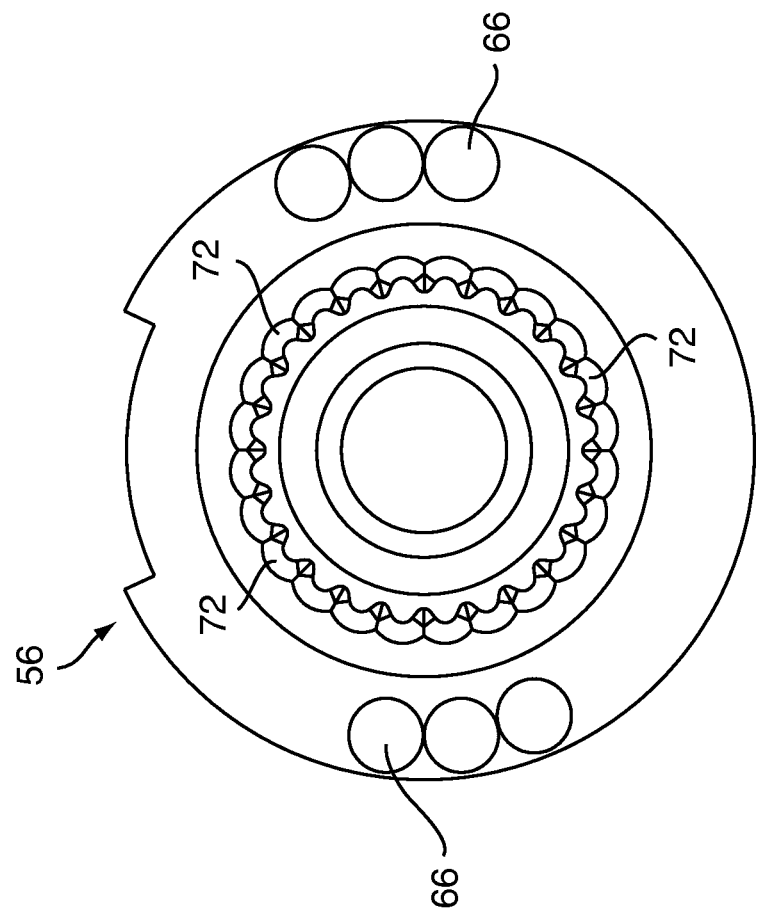
FIGS. 34-35 are views illustrating the structure of a localizer for adjusting for peel thickness.
Figure 34:
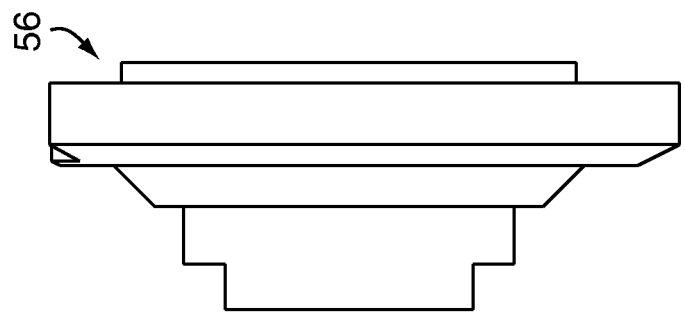

FIGS. 34 and 35 illustrate the structure of the localizer 56. As shown therein, the localizer 56 is generally disc-shaped and has a plurality of teeth 72 for matching the teeth 72 for meshing with the teeth 68 of the first lock 52. As discussed above, the localizer 56 is mounted about the main shaft 12 below the nose and above the blade assembly 14, is partially rotatable about the shaft 12, and includes a plurality of locating recesses 66 corresponding to different peel thicknesses.

As will be readily appreciated, the ability of the peeling tool 10 of the present invention to adjust for varying peel thickness is an important aspect of the present invention. In addition, the peeling tool of the present invention provides a level of safety heretofore unknown in the art by providing a sleeve that entirely covers the blade assembly when the peeling tool is not in use. Advantageously, this sleeve may also be retracted towards the end cap of the peeling tool to double as an ergonomic handle during use, as discussed above.

While the preferred embodiment of the present invention has been disclosed herein, it is understood that various modifications can be made without departing from the scope of the presently claimed invention.

What is claimed is:

1. A method for adjusting the peel thickness of a peeling tool, said method comprising the steps of:
   providing a peeling tool including a handle, a nose and a blade assembly positioned intermediate said handle and said nose and having a first arcuate blade and a second arcuate blade defining a space therebetween for the passage of a slice of a food product; and
   selectively varying a dimension of said space by rotating said nose about the longitudinal axis of the peeling tool from a first position to a second position.

2. The method for adjusting the peel thickness of a peeling tool according to claim 1, further comprising the step of:
   depressing a pushbutton on said nose to unlock said nose to permit rotation thereof.

3. A peeling tool, comprising: a handle; a nose; a blade assembly disposed intermediate said handle and said nose; and a sleeve, said sleeve being slidably movable between a first, safety position in which said sleeve encompasses said blade assembly, and a second, retracted position in which said sleeve assembly encompasses said handle, said blade assembly includes a first blade and a second blade defining a space therebetween; wherein said nose is rotatable about the longitudinal axis of the peeling tool from a first position to a second position to vary said dimension of said space.

4. The peeling tool of claim 1, further comprising:
   a sharpened tip fixedly attached to said nose.

5. The peeling tool of claim 1, wherein:
   one of said first blade and said second blade is movable along an arcuate path such that a dimension of said space can be adjusted.

6. The peeling tool of claim 3, said nose rotation defining a peel thickness adjustment mechanism, said peel thickness adjustment mechanism selectively varying a dimension of said space.

7. The peeling tool of claim 6, wherein:
   said peel thickness adjustment mechanism includes a localizer having at least 2 detents corresponding to at least two peel thicknesses and a spring biased lock ball for selectively securing said first blade and said second blade in a position corresponding to one of said at least two peel thicknesses.

8. The peeling tool of claim 6, further comprising:
   a pushbutton located in said nose, said pushbutton being actuatable to unlock said nose.

9. The peeling tool of claim 6, wherein:
   said blade assembly includes a julienne blade.

10. A peeling tool, comprising:
    a main shaft;
    a handle affixed to a first portion of said main shaft;
    a nose rotatbly coupled to a second portion of said main shaft;
    a blade assembly positioned intermediate said handle and said nose about said main shaft, said blade assembly including a first arcuate blade and a second arcuate blade defining a space therebetween for the passage of a slice of a food product; and
    a peel thickness adjustment mechanism, said peel thickness adjustment mechanism being actuatable to adjust a dimension of said space;
    wherein said peel thickness adjustment mechanism comprises said nose being rotatable about the longitudinal axis of the peeling tool from a first position to a second position to vary said dimension of said space.

11. Thee peeling tool of claim 10, wherein:
    said peel thickness adjustment mechanism is housed within said nose.

12. The peeling tool of claim 10, wherein:
    one of said first blade and said second blade is movable along an arcuate path such that said dimension of said space can be adjusted.

13. The peeling tool of claim 10, wherein:
    said peel thickness adjustment mechanism includes a localizer having at least 2 detents corresponding to at least two peel thicknesses and a spring biased lock ball for selectively securing said first blade and said second blade in a position corresponding to one of said at least two peel thicknesses.

14. The peeling tool of claim 10, further comprising:
    a pushbutton located in said nose, said pushbutton being actuatable to unlock said nose; and
    wherein rotation of said nose with respect to said main shaft from a first position to second position selectively varies said dimension of said space.

15. The peeling tool of claim 10, wherein:
    said blade assembly includes a julienne blade.

16. The peeling tool of claim 10, further comprising:
    a sleeve, said sleeve being slidably movable between a first, safety position in which said sleeve encompasses said blade assembly, and a second, retracted position in which said sleeve assembly encompasses said handle.

* * * * *